May 15, 1934. R. P. LANSING 1,959,244
ENGINE STARTER
Filed March 29, 1926
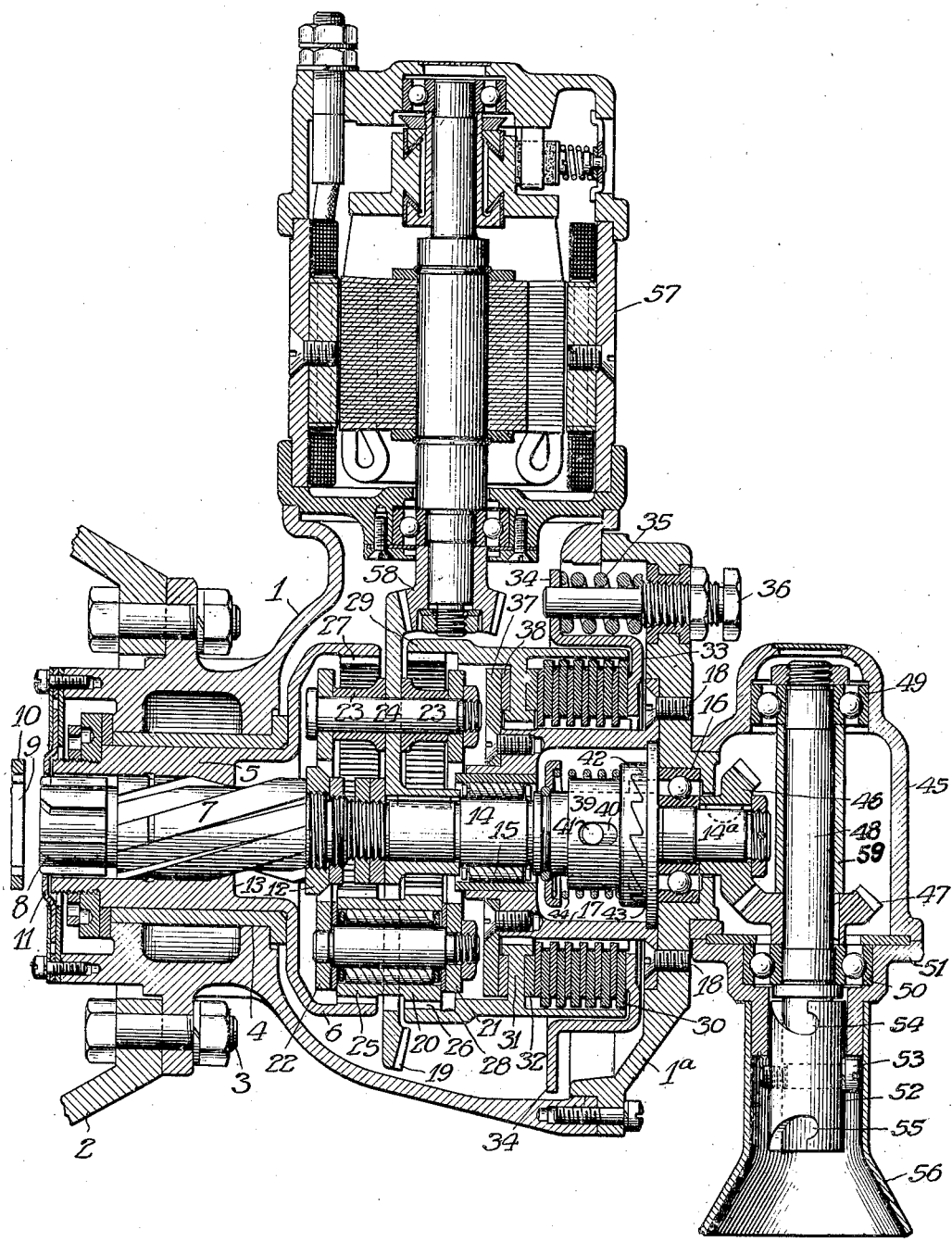
Witness
Martin H. Olsen.
Inventor
Raymond P. Lansing
By Rector, Hibben, Davis & Macauley
His Attys.

Patented May 15, 1934

1,959,244

UNITED STATES PATENT OFFICE 1,959,244

ENGINE STARTER

Raymond P. Lansing, Montclair, N. J., assignor to Eclipse Machine Company, Elmira, N. Y., a corporation of New York Application March 29, 1926, Serial No. 98,154

12 Claims. (Cl. 123—185)

My invention relates to engine starting apparatus for the starting of engines such as internal combustion engines and more particularly, but not necessarily, airplane engines and the object thereof is to provide a simple, efficient and reliable apparatus for either manual or power operation or both and characterized by a novel construction of combined reduction gearing and yielding restraining means such as a friction clutch to protect the power means against the effect of backfire and of any overload, and also characterized by the provision of novel backfire protective means for the manual means.

The figure in the accompanying drawing is a central sectional elevation of an apparatus embodying my invention and illstrating both power means and manual means for operating such apparatus.

My apparatus comprises a combined drive proper and transmission and also yielding means and a backfire release means which apparatus is adapted to be actuated either by power means such as an electric motor or by manually operated means or by both simultaneously.

First describing the drive proper the same is located within a main casing 1 which is suitably supported as by being detachably connected with the crankcase 2 of the engine in suitable manner as by the bolts 3. Within a bushing 4 in the casing there rotates a driving member which is of novel formation, comprising a nut portion 5 and a shell portion 6 extending from one end thereof. Within such nut there is mounted for longitudinal and rotary movement a driving member which is composed of a threaded or inclined spline shaft 7 and a longitudinally splined head or engaging portion 8 which is adapted to enter and engage the corresponding splines of a socket 9 of an engine member such as the end of a crank shaft 10 of the engine. In order to obtain its said longitudinal and rotary movements the shaft 7 is threaded to the interior of the nut 5 and in order to enforce longitudinal movement of such shaft when the nut is rotated detent fingers 11 are provided to engage the splines of the member 8 and prevent rotation of such shaft at the time when it should have its longitudinal advance movement in order to bring the driving member into engagement with the engine member. The inner end of the shaft 7 is provided with a stop nut 12 which is adapted to contact the shoulder 13 of the nut at the end of said longitudinal advance movement of such shaft.

Next describing the reduction gearing of which the shell 6 forms a part, a central shaft 14 which is in alignment and in tandem relation with the shaft 7 is journaled in suitable bearings 15 and 16 supported by a cover plate 1a. In the present instance the bearings 16 are directly in the plate 1a and the bearings 15 are in a cup 17 secured by screws 18 to the plate 1a. To the shaft 14 there is splined or keyed a bevel gear 19 which carries the planetary gearing composed of a series of gears 20 arranged between parallel plates 21 and 22, properly spaced apart by the spacers 23 and studs 24. Each planetary gear 20 has two sets of teeth 25 and 26, the former set meshing with the internal gear teeth 27 in the shell 6.

The other set of gear teeth 26 mesh with internal gear teeth 28 in a barrel 29 which is concentric with the cup 17 and contains the yielding restraining connection which is here in the form of a friction clutch 30. This clutch comprises a series of disks or plates in two sets, one of which is splined to the exterior of the cup 17 and the other to the interior of the barrel 29. These plates bear at one end against an internal flange 31 of the barrel through the medium of a ring 32 and the other end bears against a pressure adjusting member which is here in the form of a plate 33 having a central opening to accommodate the cup 17 and a double flange at its margin in order to provide the internal flange 34. A series of adjusting devices of which one is shown in the drawing is provided for regulating the yielding pressure upon the friction plates. As shown a spring 35 is interposed between the flange 34 and the inner face of the plate 1a and an adjustable bolt 36 screws through such plate and is adapted to apply pressure upon the spring 35 and consequently upon the friction plates. In order to hold the parts in proper relationship within the barrel 29 a ring 37 is secured to the cup 17 and bears against the flange 31 through the medium of the interposed ring 38.

The main shaft is in two portions 14 and 14a and with which is associated a backfire protective device means which comprises a sleeve 39 slidable upon such shaft and having a pin and slot connection therewith through the slot 40 in itself and the pin 41 in the shaft. The sleeve 39 has ratchet teeth 42 adapted to engage corresponding ratchet teeth 43 formed in a collar frictionally held fast in a peripheral groove provided in cup 17 adjacent the screws 18 which attach said cup to the housing 1a. These ratchet teeth are held in engagement by the spring 44 and act to hold the sleeve 39 and hence the shaft 14 against reverse rotation in case of backfire when the driving member and reduction gearing are rotated in a reverse direction. In normal cranking, however, the teeth 42 slide freely along the sloping surfaces of the teeth 43 in the usual ratcheting fashion.

Next describing the manual means the same are contained within a casing 45 which is suitably secured to the plate 1ª for rotarial adjustment for reasons hereinafter explained. The manual means comprises a bevel gear 46 detachably secured to the shaft 14ª and meshing with a corresponding bevel gear 47 which is detachably secured to a cranking shaft 48 having as its bearings 49 and 50 in the casing 45 and end head 51 respectively. A cranking sleeve 52 is detachably secured by the pin 53 to the shaft 48 whereby, whenever desired, such sleeve can be reversed in position on the shaft 48 so as to enable one or the other of the reversely inclined slots 54 and 55 to be utilized. By preference a funnel shaped sleeve 56 is secured to the head 51 to enable the ready and efficient application of the usual crank, not shown, which engages one or the other of the cranking slots 54 and 55. The gear 47 is detachably secured to the shaft 48 so that it may be changed from the full line position to the dotted line position as hereinafter explained.

Next describing the power means the same consists of an electric motor 57 which is detachably secured to the main casing in any suitable manner and whose armature shaft is provided with a bevel pinion 58 adapted to mesh with the bevel gear 19.

Describing a cycle of operation and beginning with the utilization of the electric motor as the actuating means, when the motor is energized the pinion 58 will be rotated and the reduction gearing and drive will be operated. The torque of the motor is transmitted through the bevel gear 19, shell 6, nut 5 and shaft 7. By virtue of the threaded connection between the shaft 7 and nut 5 such shaft and its engaging member 8 will be advanced longitudinally into engagement with the engine member 10. The barrel 29 is normally stationary and the planetary pinions 20 cooperate therewith as such whereby such pinions are adapted to drive the shell 6.

When the engine operates under its own power the driving member will be automatically disengaged by reason of its threaded connection with the nut 5.

The barrel 29 is normally stationary and normally constitutes the stationary internal gear of the planetary gearing and the same is normally restrained from rotation by the friction clutch except at the time of backfire overload when a yield is permitted sufficient to prevent strain or injury to the mechanism.

Next describing the operation by the utilization of the manually operated means, the operator by means of a hand crank, not shown, will rotate the shaft 48 with the result that the bevel gears 46 and 47 will be rotated and thereby the shaft 14ª. The bevel gear 19 will now be rotated and consequently the planetary gearing and the driving member as well as the barrel 29 in the manner and with the results hereinbefore explained. The hand operated means or attachment is so constructed as an assembly that it may be turned to different positions as desired. Moreover if it is desired to crank the engine in the same direction but from the opposite end of shaft 48, the bevel gear on the shaft 48 may be removed, the collar 59 pushed down in its place, and the bevel gear 47 as well as the sleeve 52 then mounted at the other end of shaft 48 as shown in dotted lines.

The described and illustrated arrangement of friction clutch is of material advantage in practical use owing to the ease and accessibility of external adjustment and the large size and capacity of clutch permitted.

I claim:

1. In an engine starter, a drive including a driving sleeve, a driving member mounted therein for movement into engagement with a member of the engine to be started and for rotary movement to crank the engine, reduction means connected with such sleeve and including a normally stationary gear, a fixed member, and a friction clutch between such gear and fixed member.

2. In an engine starter, a drive including a driving sleeve, a driving member mounted therein for movement into engagement with a member of the engine to be started and for rotary movement to crank the engine, reduction means connected with such sleeve and including a normally stationary gear having a shell extension, a stationary member, and a friction clutch between such shell extension and stationary member.

3. In an engine starter, a drive including a driving sleeve, a driving member mounted therein for movement into engagement with a member of the engine to be started and for rotary movement to crank the engine, reduction means connected with such sleeve and including a normally stationary gear having a shell extension, a stationary cup arranged concentrically within such extension, and a friction clutch between such cup and extension.

4. In an engine starter, a drive including a driving sleeve, a driving member mounted therein for movement into engagement with a member of the engine to be started and for rotary movement to crank the engine, reduction means connected with such sleeve and including a normally stationary gear having a shell extension, a stationary cup arranged concentrically within such extension, and a friction clutch composed of plates which are splined respectively to the cup and extension.

5. In an engine starter, a drive including a driving sleeve, a driving member mounted therein for movement into engagement with a member of the engine to be started and for rotary movement to crank the engine, reduction means connected with such sleeve and including a normally stationary gear having a shell extension provided with an internal flange, a stationary cup arranged concentrically within such extension, a pressure plate, and a friction clutch operatively connected with the cup and extension and disposed between such plate and flange.

6. In an engine starter, a drive including a driving sleeve, a driving member mounted therein for movement into engagement with a member of the engine to be started and for rotary movement to crank the engine, reduction means connected with such barrel and including a normally stationary gear having a shell extension provided with an internal flange, a stationary cup arranged concentrically within such extension, a pressure plate, a friction clutch operatively connected with the cup and extension and disposed between such plate and flange, and means for predetermining the pressure upon such plate and consequently upon the clutch.

7. In an engine starter, a drive including a driving sleeve, a driving member mounted therein for movement into engagement with a member of the engine to be started and for rotary movement to crank the engine, reduction means connected with such sleeve and including a gear having a shell extension provided with an internal flange, a stationary cup arranged concentrically within such extension, a pressure plate, a friction clutch operatively connected with the cup and extension and disposed between such plate and flange, a casing for such gearing, and an adjustable pressure applying device extending through such casing and acting upon such plate.

8. In an engine starter, a drive including a driving sleeve, a driving member mounted therein for movement into engagement with a member of the engine to be started and for rotary movement to crank the engine, reduction means connected with such sleeve and including a gear having a shell extension provided with an internal flange, a stationary cup arranged concentrically within such extension, a pressure plate, a friction clutch operatively connected with the cup and extension and disposed between such plate and flange, a casing for such gearing, a spring acting to apply pressure on said plate, and an adjustable screw extending through such casing and cooperating with the spring to regulate the pressure upon the plate and consequently upon the clutch.

9. In an engine starter, in combination with a housing and an engine engaging member mounted therein, a driving shaft also mounted in said housing, means drivably connecting said driving shaft and engine engaging member, a stationary element disposed entirely within said housing and secured to the inner surface thereof and means engageable with both said element and connecting means to normally hold one element of said connecting means stationary.

10. In an engine starter, in combination with a housing and an engine engaging member mounted therein, a driving shaft also mounted in said housing, means drivably connecting said driving shaft and engine engaging member, a stationary element having a portion surrounding and supporting said shaft intermediate its ends, and a locking member mounted on said shaft and secured to said stationary element to prevent reverse rotation of said driving shaft in the event of a backfire of the engine being started.

11. In an engine starter, a drive including a housing, a member mounted therein for movement into engagement with a member of the engine to be started, to crank the engine, reduction means connected with such engine engaging member, power means and manual means respectively operatively connected with the reduction means, and unitary means for preventing reverse rotation of either said power means or said manual means in the event of backfire.

12. In an engine starter, a drive including a housing, a member mounted therein for movement into engagement with a member of the engine to be started, to crank the engine, reduction means connected with such engine engaging member, power means and manual means respectively operatively connected with the reduction means, means interposed between said housing and an element of said reduction means for normally holding the latter against rotation, and means including a locking part engageable with said holding means and a cooperating element normally rotatable with said manual means for restraining reverse rotation of another element of said reduction means, said last named element being drivably connected with both said power means and manual means.

RAYMOND P. LANSING.